March 1, 1932.  G. E. FAILING  1,847,824
ROCK BIT CONE
Filed June 14, 1930
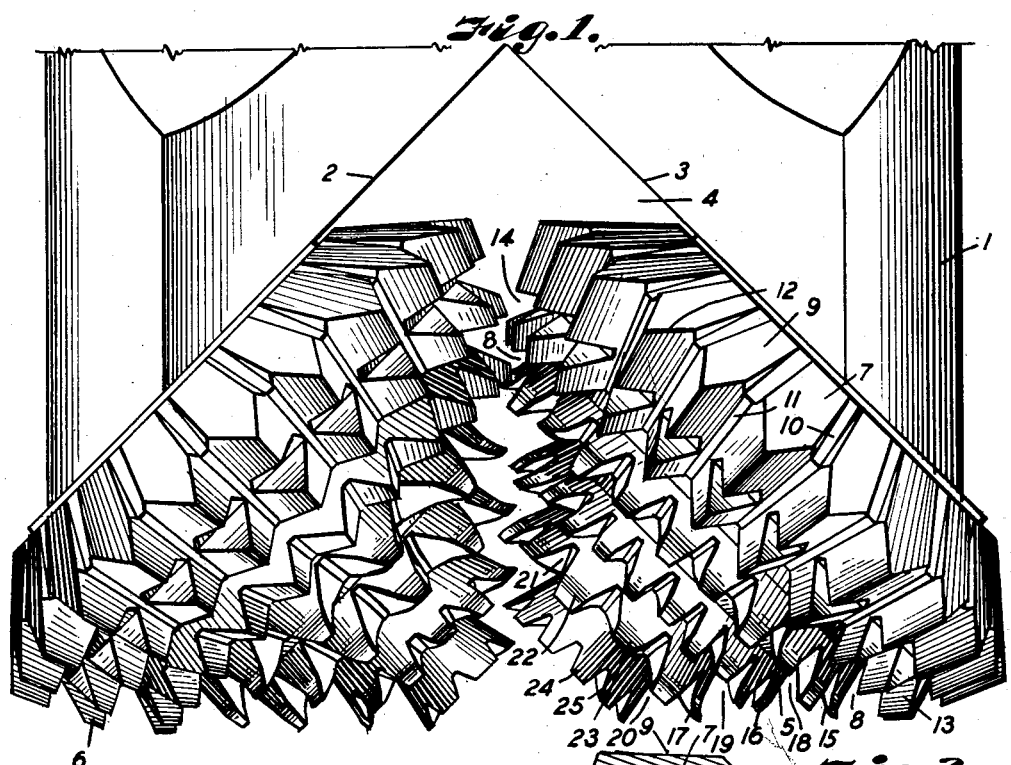
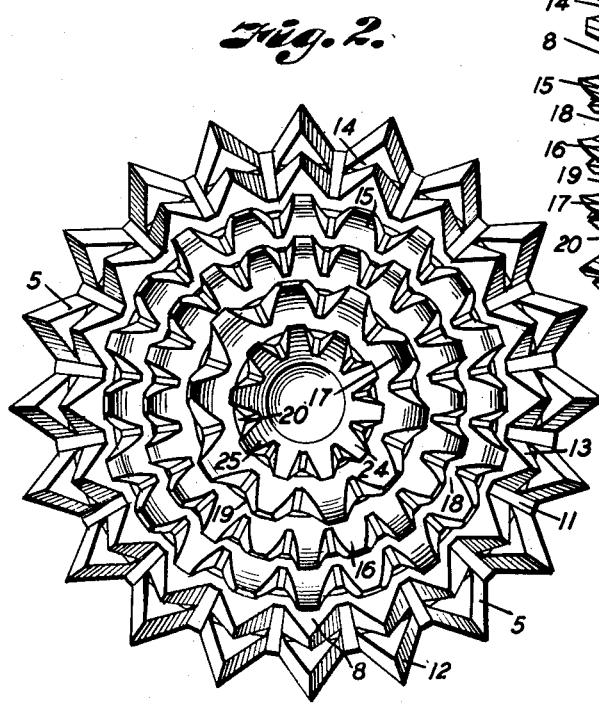
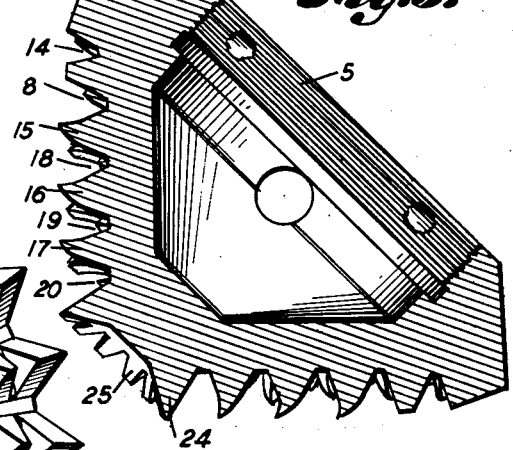
INVENTOR.
George E. Failing.
BY
ATTORNEY.

Patented Mar. 1, 1932

1,847,824

UNITED STATES PATENT OFFICE

GEORGE E. FAILING, OF GARBER, OKLAHOMA, ASSIGNOR TO GARBER TOOL COMPANY, OF GARBER, OKLAHOMA, A CORPORATION OF OKLAHOMA; E. A. REED, TRUSTEE OF SAID CORPORATION, BANKRUPT

ROCK BIT CONE

Application filed June 14, 1930. Serial No. 461,138.

My invention relates to bits for rotary well drilling apparatus and more particularly to rock bit cones including blades having notched cutting edges ordinarily mounted in pairs on a rotating hollow drill stem for drilling in hard formations, the cutting edges being arranged in conical formation to revolve on the bottom of a well hole around the axis of the stem for cutting and dislodging hard material.

In common forms of rock bit cones, the conical surface of a cone is grooved or notched circumferentially and longitudinally to form concentric blades notched to form circumferential series of teeth, or spaced longitudinal series of teeth, the cutting edges of the teeth in each longitudinal series being aligned and lying in a plane including the axis of the cone. All the teeth are symmetrically beveled, and all are pressed in the same manner into the bottom of a well to form triangular indentations extending radially on the bottom, and crush the rock of which the bottom may be composed.

The principal objects of my invention therefore, are to vary the form of teeth in a series on a rock bit cone whereby adjacent teeth will confer different cuts on the bottom of a well, to confer oblique sets on the teeth of a rock bit cone to cause the teeth to lift rock particles broken or cut by indenting action of the teeth, to turn the cutting edges of adjacent teeth in a series in opposite directions for increasing the efficiency and scope of effect of a series of teeth operating on rock in the bottom of a well, and to provide sawlike circumferentially extending blades on a rock bit cone.

Such saw-like circumferential blades will be spaced by circular grooves notched to form teeth having circumferentially extending cutting edges and provide channels connecting the grooves.

If the notches forming the channels were provided as in ordinary practice, they would have substantially parallel walls, thus materially reducing the thickness of the teeth at their bases to provide channels of desired width, or narrowly spacing the teeth in the circular series, and the blades would have cutting edges lying in circles whereby the cutting edges of the teeth would be aligned.

Successive cutting action of the series of teeth would therefore effect cutting of a series of identical indentations in the rock at the bottom of a well hole, for example the conformation of each cut being identical with the conformation of each other cut, whereby particles of rock would be broken out only in the direction of principal curvature of the blades.

Further objects of my invention therefore are to form blade teeth having circumferentially extending cutting edges and inwardly diverging side edges whereby adequate channels may be afforded between the teeth of a blade without weakening the teeth, to provide sufficient spacing between adjacent arcuate cutting edges of teeth on a curved blade, to enhance the efficiency of the cone, to incline cutting edges of adjacent teeth away from the normal median line of the cutting edge of the blade, and to provide circularly arranged cutting edges having alternate teeth turned in opposite directions for increasing the efficiency of the blade for penetrating, breaking up and dislodging hard material at the bottom of the well hole.

In accomplishing these and other objects of my invention, I have provided improved details of structure, the preferred forms of which are illustrated in the accompanying drawings, wherein:

Fig. 1 is a side elevation of the lower portion of a rotary drill bit including cones constructed in accordance with my invention.

Fig. 2 is a bottom view of the cone shown at the right in Fig. 1.

Fig. 3 is a vertical central section through the cone shown in Fig. 2.

Referring in detail to the drawings:

1 designates a drill head or supporting body of a drill bit which may be of ordinary construction for attachment to the lower end of a rotary drill stem and having angularly disposed plane faces 2 and 3 forming a bottom recess 4 to receive a pair of cones 5 and 6 rotatably mounted on the head for drilling a well hole upon rotation of the bit.

The cone 5 includes a base 7 defined by an annular groove 8 and having a face 9 inclined outwardly toward the apex of the cone notched to form longitudinal or radial water courses 10. Longitudinal notches 11 form radial channels communicating with the courses 10 and form teeth 12 and 13 having cutting edges extending in plane including the axis of the cone divided by a supplemental annular groove 14.

A series of cutting blades 15, 16, and 17 is further provided on the cone spaced from the base teeth by the groove 8 and further formed by annular grooves 18, 19 and 20 cut in the face of the cone, each blade having notches 21 at regular intervals to form spaced teeth such as 22 and 23 having sharp relatively long arcuate cutting edges extending in circular alignment.

The notches 21 are wider at the top than at the bottom whereby the cutting edges of the teeth are relatively narrower than the bases thereof, and maximum strength is afforded for the teeth while the adjacent ends of cutting edges of the teeth are relatively widely spaced. The notches form channels providing communication between adjacent concentric annular grooves and sufficiently deep and wide to permit free flow of slush from one groove to another, but are shallower than said grooves.

The bottoms of the notches between the teeth of the base and of the blades are flat and are aligned to provide continuous channels through the blades and the toothed base to the water courses 10.

The outer ends of the teeth 22 and 23 are preferably alternately set toward the base and toward the apex of the cone to provide oppositely curved and inclined cutting edges on adjacent teeth whereby each tooth will penetrate a rock surface in a slightly offset position from a circle on the rock surface which includes the cut made by the immediately adjacent tooth, and two adjacent teeth will tend to shift rock particles in different directions.

The cone further includes an apical circular blade 24 notched to form circularly arranged teeth 25 having cutting edges abutting a plane, each tooth having downwardly diverging side edges.

The opposite cone 6 is substantially the same as the cone 5 just described with the exception that the teeth are differentiated from those of the first cone sufficiently to enable the cones to mesh as they revolve on the bottom of the well hole, each cone having series of teeth with longitudinally extending cutting edges, a plurality of circular blades notched to form arcuate teeth, including a plurality of teeth differentiated by opposite inclination of their cutting edges.

In using a cone constructed as described, the oppositely inclined cutting edges of adjacent teeth on the intermediate blades will break up a much wider annular area on the well bottom, and break the dislodged particles of rock into smaller fractions, than would be the case with a blade having cutting edges circularly or rectilinearly aligned.

The oppositely set cutting edges of the teeth thus perform a service similar to the cutting of a kerf or relatively wide groove by a saw as contrasted with the indentation or slicing of material by a knife having a rectilinear cutting edge, or a saw having perfectly aligned teeth.

The inclined tooth walls forming the notches and radial slush channels provide teeth having relatively thick bases, and relatively widely spaced cutting edges, whereby greater opportunity is afforded each tooth for dislodging and lifting a rock particle without interference by an adjacent tooth with the rock acted on by the first named tooth. The efficiency of the cone is thus enhanced, and a larger amount of rock will be broken up and dislodged upon each revolution of a cone than would occur if adjacent teeth were closer together.

What I claim and desire to secure by Letters Patent is:

1. A rock bit cone having a series of concentric circular cutting edges notched to form teeth, the cutting edges of said teeth being inclined in opposite directions.

2. A rock bit cone having a series of concentric circular blades notched to form teeth having cutting edges, said cutting edges of adjacent teeth on each blade being alternately inclined in opposite directions.

3. A device of the class described comprising a conical body portion having a plurality of circular rows of projecting teeth provided with cutting edges, said rows being arranged parallel to each other, the cutting edges of certain rows of teeth arranged and flanged at right angles to the axis of the conical body and being alternately offset in opposite directions.

In testimony whereof I affix my signature.

GEORGE E. FAILING.